Nov. 22, 1960     A. E. UHLEEN     2,961,336
METHOD OF HOT COATING STRIP MATERIALS WITH PAINTS OR ENAMELS
Filed June 17, 1955
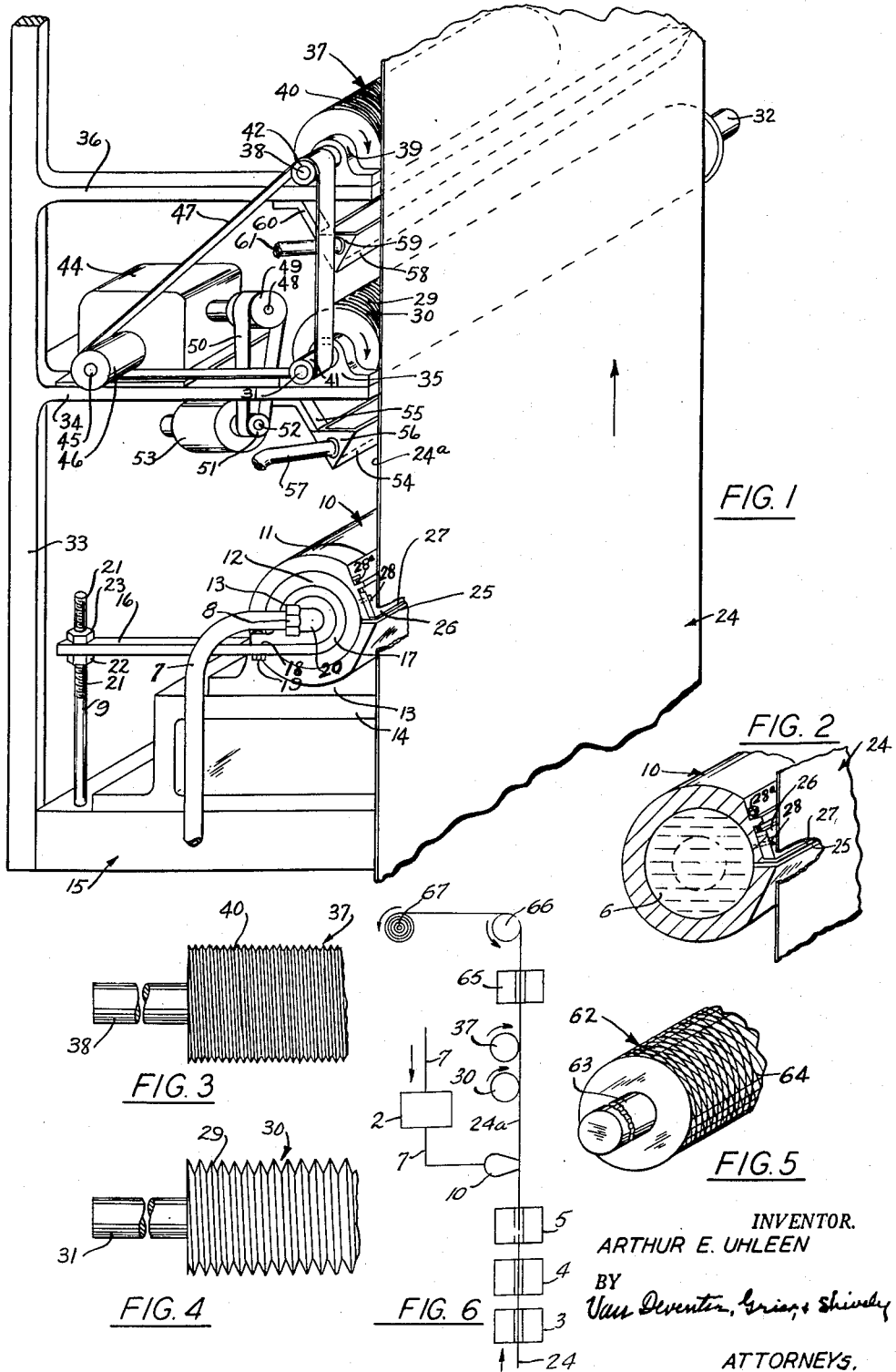
INVENTOR.
ARTHUR E. UHLEEN
BY
ATTORNEYS.

United States Patent Office 2,961,336
Patented Nov. 22, 1960

2,961,336

METHOD OF HOT COATING STRIP MATERIALS WITH PAINTS OR ENAMELS

Arthur E. Uhleen, Allentown, Pa., assignor, by mesne assignments, to National Steel Corporation, a corporation of Delaware Filed June 17, 1955, Ser. No. 516,168

4 Claims. (Cl. 117—49)

This invention relates to improvements in the art of applying paints or enamels to the surfaces of strips of materials while they are in motion. In one of its more specific embodiments, the invention is directed to a method of applying paints or enamels to a surface area of strip material moving along a substantially vertical path in which the rate or speed of the application is greater than has heretofore been attained.

An object of the invention is the method of lowering the viscosity of the paint or enamel without adding solvent thereto, said method including the step of heating the paint or enamel to a pre-determined temperature below the flash point thereof.

A further object of the invention in connection with the attainment of greater speeds is to speed up the drying of the coatings by mixing the paints with a quantity of solvent very much lower than has heretofore been used in preparing paint or enamel for any kind of application, heating the paint or enamel to substantially reduce its viscosity, and then applying the heat-thinned paint or enamel to metallic strips to assure more rapid drying due to the scarcity of volatile solvents in the paint or enamel and consequently speeding up of the process.

Yet another object of the invention is the provision of a process wherein not only the amount of solvents in the paint are minimized but also both the paint and the strip material to be coated are preheated so that a minimum of coating material is used, and the minimum of solvent in the coating material dries out very rapidly.

Another object of the invention is a method wherein a coating of paint is applied to an elongated strip, and including subsequent steps of leveling the coating and the final step of metering or gauging the coating to a pre-determined thinness.

Other objects and advantages of the invention will be apparent to those skilled in the art upon a study of this specification and the accompanying drawings.

Referring to the drawings which illustrate diagrammatically apparatus suitable for practicing the invention:

Figure 1 is a diagrammatic representation of a strip being transported on a vertical path and several operations being performed on the saem during its transit;

Figure 2 is a fragmentary view, partly in cross-section, of an applicator showing more details than those shown in Figure 1;

Figure 3 is an elevational view showing a portion of my finely threaded roller for finally metering the thickness of the coating to produce a predetermined thinness;

Figure 4 is an elevational view similar to that of Figure 3, except that the threads thereon are coarser for leveling the coating;

Figure 5 is a perspective view of a portion of a modified roller having its outer periphery knurled or otherwise configurated into a pattern other than threaded and adapted to level off and thin coatings to a level coating of a predetermined thickness; and Figure 6 is a diagrammatic representation of an arrangement of apparatus suitable for practicing the present invention.

The apparatus shown herein for practicing the invention includes one of my improved applicators such as is shown, described, and claimed in my application Serial Number 326,256, filed December 16, 1952, now Patent No. 2,784,697, dated March 12, 1957, and is a continuation-in-part of said application.

The applicator per se, Figures 1 and 2, comprises a hollow cylindrical member 10 having a head 11 on one end thereof, and having an elongated stub shaft 12 extending axially and outwardly therefrom into a bearing block 13 which is in turn secured on a support 14. The support 14 is a portion of a frame generally designated by the numeral 15.

The other end of the applicator may be provided with a like head and stud shaft extending into a like bearing block. With aligned stud shafts extending into such bearing blocks, the applicator is freely rotatable, but for one restraining feature in which an arm 16 has a curvilinear portion 17 which embraces the shaft 12 and terminates in a tab portion 18, and aligned holes in the arm and in said tab portion accommodate a clamping screw 19 which effects and maintains a positive fixed relation between said arm and said applicator.

The frame 15 carries a vertical shaft 9 which has threads 21 thereon. The shaft 9 extends through a suitable hole in the arm 16, and a lower nut 22 and an upper nut 23 are used to slightly rotate the applicator 10 and thereby adjust the relation of a longitudinal slot 25 in the applicator relative to the strip material to be coated and thereby the thickness of the coating applied upon the surface of the elongated strip is controlled. This slot or slit 25 is formed in the body of the cylindrical member 10 and extends longitudinally from end to end thereof. The body 10 (Figure 2) also has flattened surfaces adjacent to the edges which define the slot 25. One of these flattened surfaces carries a flat plate member or blade 26, the longitudinal edge 27 of which is adjustable relative to the edge of the slot for regulating the effective width of said slot and consequently the quantity of coating material delivered to an elongated strip 24. The blade 26 is held to the body 10 by means of screws 28 extending through elongated holes in the blade and engaging threaded holes in the body 10. Backing up the outer edge of the blade are screws 28a which are provided for retaining any desired adjustment.

This elongated strip 24, which may be ferrous metal strip is carried on transporting rollers (not shown) and is moved upwardly along a vertical path at a predetermined rate, and it is understood that this strip has previously been processed and cleaned to make it chemically clean and it retains sufficient heat to maintain it at a temperature which is sufficiently below the flash point of the paint or other coating material to provide a practical factor of safety.

The paint or other coating materials are also maintained at elevated temperatures approaching the temperature of the strip 24.

The applicator 10, which may be seen in Figures 1 and 2 has a fitting 20 which threadedly engages a hole in the end of the applicator, and a conduit 7 is connected to the fitting 20 by means of an element 8 of the fitting. The conduit 7 is connected to a source of paint or other coating fluid, it being understood that the solvent content thereof is substantially less than the amount of solvent ordinarily employed.

The coating fluid is delivered via the conduit 7 and the fitting 8 to the hollow interior 6 of the applicator under pressure, and in many instances the applicator and the conduit may be insulated in any suitable manner to minimize the leakage of heat from the coating fluid.

Now when applying coating fluids at the rates referred to herein, the adjustments referred to above cannot prevent too much of said coating fluids from being applied to the surfaces of said strip; therefore, I provide a leveling roll spaced apart from the applicator. This "leveling roll" may comprise a roll 30 having fairly coarse threads 29 formed on the outer periphery thereof, has a shaft extension 31 on one end, and a similar shaft extension 32 on the other end thereof.

A vertical frame member 33 is connected to the base portion 15 and it extends upwardly. A horizontal arm 34 extends laterally from the vertical frame member 33 and supports a bearing 35 into which the shaft 31 is journaled. The shaft 32 is journaled in a similar bearing supported on a similar horizontal arm (not shown).

The periphery of the roller 30 may contact the face 24a of the strip 24. In order to make the leveling roll most effective it should be rotated in either direction on the shafts 31 and 32; however, I prefer to rotate the roller 30 in a direction counter to the movement of the strip 24 as indicated on the end thereof in Figure 1 by a clockwise arrow.

The vertical frame member 33 also has a second horizontal arm 36, which is parallel to and spaced apart from the arm 34. A second roller 37 which has, for example, finer threads 40 than those on the roller 30 is provided with shaft extensions on each end thereof journaled in suitable bearings. One of these may be seen at 38 and it is journaled in a bearing 39 supported on the arm 36. The shaft 31 carries a pulley 41, while the shaft 38 carries a pulley 42 aligned with the pulley 41. A speed reducer 44 is mounted on a frame comprised of the arm 34, and it has an output shaft 45 upon which a pulley 46 is carried in alignment with the pulleys 41 and 42 and these three pulleys are spanned by a belt 47 which drives the rollers 30 and 37 in unison.

The speed reducer has an input shaft 48 carrying a pulley 49 which is spanned by a belt 50 which also embraces a small pulley 51 carried on a shaft 52 of an electric motor 53 supported on the frame. Thus the motor drives both the roller 30 and the roller 37 in a clockwise direction and at uniform speeds. I term the roller 37 my "metering roll," since it contacts the strip after the roller 30 has performed a "leveling" operation.

Beneath the roller 30 is a drain trough 54 supported on frame member 34 by means of a bracket 55. The end of the trough carries a fitting 56 to which one end of a conduit 57 is connected. This conduit is connected to a system (not shown) for returning the excess coating to the source to which the conduit 7 is connected, so that the surplus coating material can be re-circulated.

Beneath the roller 37 is a drain trough 58 which is supported on the frame arm 36 by means of a bracket 60. The end 59 of the trough carries a fitting to which one end of a conduit 61 is connected, and this conduit is also connected to the system for returning the excess coating to the source to which the conduit 7 is connected, so that said surplus coating material can be re-circulated.

In Figure 3, I show a portion of my "metering roll" 37 in elevation, and this roll has formed on its periphery comparatively fine threads 40.

The "leveling roll" 30 is shown in Figure 3, and it carries comparatively coarse threads 29.

A modified type of roll 62 is shown in Figure 5, and it has shaft extensions on each end thereof one of them being shown at 63. The outer surface of the roll 62 is configured or embossed with a desired design for obtaining certain desired effects. For example, I may form the surface 64 by knurling it, with the lead of the knurl tending to the right end or to the left end.

By the same token, the threads 29 and 40 on the rolls 30 and 37 may be right hand or left hand according to the results desired.

Referring now to Figure 6 of the drawing, which illustrates one arrangement of apparatus suitable for practising the invention, steel strip 24 is shown passing successively through cleaning unit 3, dryer 4 for drying the cleaned strip, and heater 5 for heating the strip to a temperature approaching the flash point of the paint to be applied. The cleaned and dried hot strip 24 is then coated on surface 24a with hot paint applied by applicator 10, and the resultant coating of paint levelled and metered by means of rollers 30 and 37 before passing to dryer 65 where the coating is dried. The strip then passes over driven roll 66 and is coiled on driven coiling means 67. The roll 66 and coiling means 67 may be driven at speeds providing a strip speed above 200 feet per minute by conventional means not shown in the interest of simplifying the drawings. Hot paint may be supplied to applicator 10 by means of conduit 7, and the paint may be heated to a temperature approaching the flash point by means of heater 2. While a large variety of suitable paints and types of metal strip to be coated are known to the art, examples of satisfactory paints and metal strip are disclosed in U.S. Patent 2,516,351, issued July 25, 1950, and U.S. Patent 2,533,911, issued December 12, 1950.

Although I have herein shown and described, by way of example, apparatus for practicing the invention it will be understood that many changes may be made in the apparatus without departing from the spirit of the invention.

I claim:

1. A method of coating metal strip with paint comprising the steps of passing heated metal strip along an upwardly extending path, extruding a coating of heated paint against at least one face of the heated metal strip as it is being passed along the upwardly extending path, the paint being at a temperature approaching the flash point, the metal strip being at a temperature at least about that of the heated paint, and then leveling and metering the extruded coating by urging the coating counter to the direction of travel of the strip while also urging the coating laterally to thereby obtain a uniform coating of paint.

2. A method of coating metal strip with paint comprising the steps of passing heated metal strip along a substantially vertical path at a speed greater than 200 feet per minute, extruding a coating of heated paint against a face of the heated metal strip, the paint being at a temperature approaching the flash point, the metal strip being at a temperature at least about that of the heated paint, and then leveling and metering the extruded coating by urging the coating counter to the direction of travel of the strip while also urging the coating laterally to thereby obtain a uniform coating of paint.

3. A method of coating metal strip with paint comprising the steps of passing heated metal strip along a predetermined path, applying a coating of heated paint onto a surface area of the heated metal strip as it is being passed along the path, the paint being at a temperature approaching the flash point and the metal strip being at a temperature at least about that of the heated paint, and then levelling and metering the applied coating by urging the coating counter to the direction of travel of the strip while also urging the coating laterally to thereby obtain a uniform coating of paint.

4. A method of coating metal strip with paint comprising the steps of passing heated metal strip along an upwardly extending path at a speed greater than 200 feet per minute, applying a coating of heated paint onto a surface area of the heated metal strip as it is being passed along the upwardly extending path, the paint being at a temperature approaching the flash point and the metal strip being at a temperature at least about that of the heated paint, and then levelling and metering the applied coating by urging the coating counter to the direction of travel of the strip while also urging the coating laterally to thereby obtain a uniform coating of paint.

References Cited in the file of this patent

UNITED STATES PATENTS

| | | |
|---|---|---|
| 623,389 | Williams | Apr. 18, 1899 |
| 1,165,367 | Wyman | Dec. 21, 1915 |
| 1,676,363 | Seidell et al. | July 10, 1928 |
| 1,826,697 | Charch et al. | Oct. 6, 1931 |
| 1,956,562 | Coates | May 1, 1934 |
| 2,091,572 | Swan | Aug. 31, 1937 |
| 2,117,200 | Miller | May 10, 1938 |
| 2,138,578 | Hershberger | Nov. 29, 1938 |
| 2,154,643 | Steren et al. | Apr. 18, 1939 |
| 2,279,686 | Kerlin | Apr. 14, 1942 |
| 2,309,585 | Haddock | Jan. 26, 1943 |
| 2,309,981 | Randall | Feb. 2, 1943 |
| 2,372,248 | Bouton | Mar. 27, 1945 |
| 2,464,771 | Van Guelpen | Mar. 15, 1949 |
| 2,765,769 | Schroeder | Oct. 9, 1956 |
| 2,784,697 | Uhleen | Mar. 12, 1957 |

OTHER REFERENCES

"Hot Spray Process," Organic Coating Technology, vol. I, Payne, pages 433–436 relied on, Wiley and Sons, Inc. (1954).